US007469307B2

(12) United States Patent
Hosoya et al.

(10) Patent No.: US 7,469,307 B2
(45) Date of Patent: *Dec. 23, 2008

(54) STORAGE SYSTEM WITH DMA CONTROLLER WHICH CONTROLS MULTIPLEX COMMUNICATION PROTOCOL

(75) Inventors: Mutsumi Hosoya, Fujimi (JP); Naoki Watanabe, Hachioji (JP); Shuji Nakamura, Yokohama (JP); Yasuo Inoue, Odawara (JP); Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 11/652,567

(22) Filed: Jan. 12, 2007

(65) Prior Publication Data

US 2007/0130385 A1    Jun. 7, 2007

Related U.S. Application Data

(63) Continuation of application No. 10/826,471, filed on Apr. 16, 2004, now Pat. No. 7,231,469.

(30) Foreign Application Priority Data

Feb. 16, 2004    (JP)    ............................. 2004-038459

(51) Int. Cl.
*G06F 13/28*    (2006.01)
*G06F 3/00*    (2006.01)
*G06F 13/36*    (2006.01)
*G06F 13/00*    (2006.01)
*G06F 15/167*    (2006.01)

(52) U.S. Cl. ............................. 710/74; 710/22; 710/51; 710/308; 710/316; 709/212; 709/213

(58) Field of Classification Search ................... 710/22, 710/74, 51, 308, 316; 709/212, 213
See application file for complete search history.

(56) References Cited

U.S. PATENT DOCUMENTS

| 5,140,592 | A | 8/1992 | Idleman et al. |
| 5,201,053 | A | 4/1993 | Benhase et al. |
| 5,206,943 | A | 4/1993 | Callison et al. |
| 5,249,279 | A | 9/1993 | Schmenk et al. |

(Continued)

FOREIGN PATENT DOCUMENTS

DE    10 2004 013112    6/2005

(Continued)

*Primary Examiner*—Niketa I Patel
(74) *Attorney, Agent, or Firm*—Mattingly, Stanger, Malur & Brundidge, PC

(57) ABSTRACT

A disk controller has a channel adapter having a connection interface to a host computer or a disk drive; a memory adapter for temporarily storing data to be transferred between the host computer and disk drive; a processor adapter for controlling operations of the channel adapter and memory adapter; and a switch adapter for configuring an inner network by interconnecting the channel adapter, memory adapter and processor adapter, wherein the channel adapter, memory adapter, processor adapter and switch adapter each include a DMA controller for performing a communication protocol control of the inner network; and packet multiplex communication is performed among the DMA controllers provided in the adapters. The disk controller can realize a high transfer efficiency and a low cost while retaining a high reliability.

4 Claims, 16 Drawing Sheets

U.S. PATENT DOCUMENTS

| | | | |
|---|---|---|---|
| 5,257,391 | A | 10/1993 | DuLac et al. |
| 5,511,227 | A | 4/1996 | Jones |
| 5,548,788 | A | 8/1996 | McGillis et al. |
| 5,574,950 | A | 11/1996 | Hathorn et al. |
| 5,586,127 | A | 12/1996 | Moriuchi |
| 5,729,763 | A | 3/1998 | Leshem |
| 5,740,465 | A | 4/1998 | Matsunami et al. |
| 5,761,534 | A | 6/1998 | Lundberg et al. |
| 5,949,982 | A | 9/1999 | Frankeny et al. |
| 5,974,058 | A | 10/1999 | Burns et al. |
| 6,108,750 | A | 8/2000 | Yamamoto et al. |
| 6,148,349 | A | 11/2000 | Chow et al. |
| 6,330,626 | B1 | 12/2001 | Dennin et al. |
| 6,385,681 | B1 | 5/2002 | Fujimoto et al. |
| 6,401,149 | B1 | 6/2002 | Dennin et al. |
| 6,535,953 | B1 | 3/2003 | Kakiuchi |
| 6,542,951 | B1 | 4/2003 | Sangveraphunski et al. |
| 6,542,961 | B1 | 4/2003 | Matsunami et al. |
| 6,581,137 | B1 | 6/2003 | Sandorfi |
| 6,601,134 | B1 | 7/2003 | Yamagami et al. |
| 6,604,155 | B1 | 8/2003 | Chong |
| 6,609,164 | B1 | 8/2003 | Kallat |
| 6,611,879 | B1 | 8/2003 | Dobecki |
| 6,631,433 | B1 | 10/2003 | Paluzzi |
| 6,636,933 | B1 | 10/2003 | MacLellan et al. |
| 6,651,130 | B1 | 11/2003 | Thibault |
| 6,671,767 | B2 | 12/2003 | Furuumi et al. |
| 6,684,268 | B1 | 1/2004 | Paluzzi |
| 6,711,632 | B1 | 3/2004 | Chow et al. |
| 6,779,071 | B1 | 8/2004 | Kallat et al. |
| 6,792,506 | B2 | 9/2004 | Solomon et al. |
| 6,813,689 | B2 | 11/2004 | Baxter, III |
| 6,816,916 | B1 | 11/2004 | Black et al. |
| 6,820,171 | B1 | 11/2004 | Weber et al. |
| 6,834,326 | B1 | 12/2004 | Wang et al. |
| 6,865,643 | B2 | 3/2005 | Baxter, III |
| 6,868,479 | B1 | 3/2005 | Thibault et al. |
| 6,874,039 | B2 | 3/2005 | Ganapathy et al. |
| 6,877,059 | B2 | 4/2005 | Solomon et al. |
| 6,889,301 | B1 | 5/2005 | Wilson et al. |
| 6,901,468 | B1 | 5/2005 | Paluzzi |
| 6,910,102 | B2 | 6/2005 | Matsunami et al. |
| 6,952,734 | B1 | 10/2005 | Gunlock et al. |
| 6,961,788 | B2 | 11/2005 | Kanai et al. |
| 6,970,972 | B2 | 11/2005 | Hosoya |
| 6,985,994 | B2 | 1/2006 | Kanai et al. |
| 2001/0054120 | A1 | 12/2001 | Horikawa et al. |
| 2002/0087751 | A1 | 7/2002 | Chong |
| 2002/0188786 | A1 | 12/2002 | Barrow et al. |
| 2003/0046460 | A1 | 3/2003 | Inoue et al. |
| 2003/0061297 | A1 | 3/2003 | Fujimoto |
| 2003/0084237 | A1 | 5/2003 | Yoshida et al. |
| 2003/0131192 | A1 | 7/2003 | Nakamura et al. |
| 2003/0140192 | A1 | 7/2003 | Thibault et al. |
| 2003/0182502 | A1 | 9/2003 | Kleiman et al. |
| 2003/0182516 | A1 | 9/2003 | Fujimoto |
| 2003/0188032 | A1 | 10/2003 | Solomon et al. |
| 2003/0188098 | A1 | 10/2003 | Baxter, III |
| 2003/0188099 | A1 | 10/2003 | Baxter et al. |
| 2003/0188100 | A1 | 10/2003 | Solomon et al. |
| 2003/0191892 | A1 | 10/2003 | Fujimoto et al. |
| 2003/0204649 | A1 | 10/2003 | Kanai et al. |
| 2003/0229757 | A1 | 12/2003 | Hosoya et al. |
| 2004/0024951 | A1 | 2/2004 | Aruga |
| 2004/0098529 | A1 | 5/2004 | Sangveraphunski et al. |
| 2004/0103244 | A1 | 5/2004 | Fujimoto et al. |
| 2004/0111485 | A1 | 6/2004 | Mimatsu et al. |
| 2004/0111560 | A1 | 6/2004 | Takase et al. |
| 2004/0123028 | A1 | 6/2004 | Kanai et al. |
| 2004/0139260 | A1 | 7/2004 | Steinmetz et al. |
| 2004/0139365 | A1 | 7/2004 | Hosoya |
| 2004/0177182 | A1 | 9/2004 | Metevier et al. |
| 2004/0186931 | A1 | 9/2004 | Maine |
| 2004/0193760 | A1 | 9/2004 | Matsunami et al. |
| 2004/0193973 | A1 | 9/2004 | Porat et al. |
| 2004/0199719 | A1 | 10/2004 | Valin et al. |
| 2004/0205269 | A1 | 10/2004 | Stolowitz |
| 2004/0243386 | A1 | 12/2004 | Stolowitz et al. |
| 2004/0257857 | A1 | 12/2004 | Yamamoto et al. |
| 2005/0010715 | A1 | 1/2005 | Davies et al. |
| 2005/0021884 | A1 | 1/2005 | Jeddeloh |
| 2005/0021888 | A1 | 1/2005 | Yatziv et al. |
| 2005/0060443 | A1 | 3/2005 | Rosner |
| 2005/0071424 | A1 | 3/2005 | Baxter, III |
| 2005/0071556 | A1 | 3/2005 | Walton et al. |
| 2005/0076177 | A1 | 4/2005 | Mori |
| 2005/0080946 | A1 | 4/2005 | Hosoya |

FOREIGN PATENT DOCUMENTS

| | | |
|---|---|---|
| EP | 1353264 | 10/2003 |
| GB | 2 366 049 | 2/2002 |
| JP | 05-242006 | 9/1993 |
| JP | 07-056693 | 3/1995 |
| JP | 07-200187 | 8/1995 |
| JP | 07-210320 | 8/1995 |
| JP | 09-198308 | 7/1997 |
| JP | 10-105347 | 4/1998 |
| JP | 2000-298641 | 10/2000 |
| JP | 2003-263279 | 9/2003 |
| WO | 88/03679 | 5/1988 |
| WO | 91/13404 | 9/1991 |
| WO | 02/03387 | 1/2002 |
| WO | 03/043254 | 5/2003 |

DISK CONTROLLER OF INVENTION

DLE STRUCTURE USED BY INVENTION

DMAC STRUCTURE USED BY INVENTION

CHANNEL ADAPTER STRUCTURE USED BY INVENTION

PROCESSOR ADAPTER STRUCTURE USED BY INVENTION

MEMORY ADAPTER STRUCTURE USED BY INVENTION

SWITCH ADAPTER STRUCTURE USED BY INVENTION

PACKET STRUCTURE USED BY INVENTION

PACKET FLOW USED BY INVENTION

PROTOCOL USED BY INVENTION

MULTIPLEX COMMUNICATION TRANSFER PROTOCOL

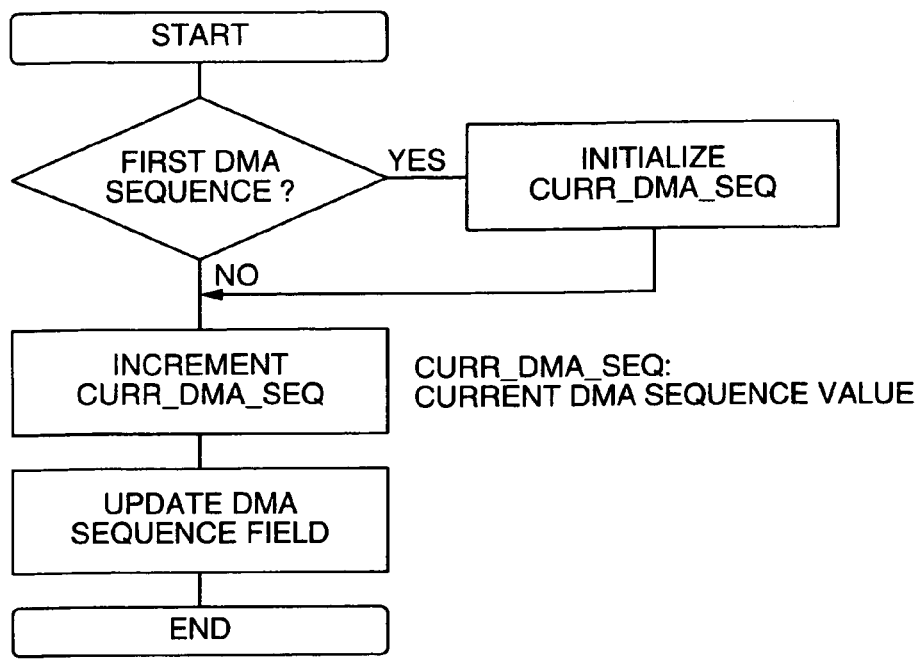
DMA SEQUENCE FIELD UPDATE FLOW DURING
SUB-DMA TRANSMISSION
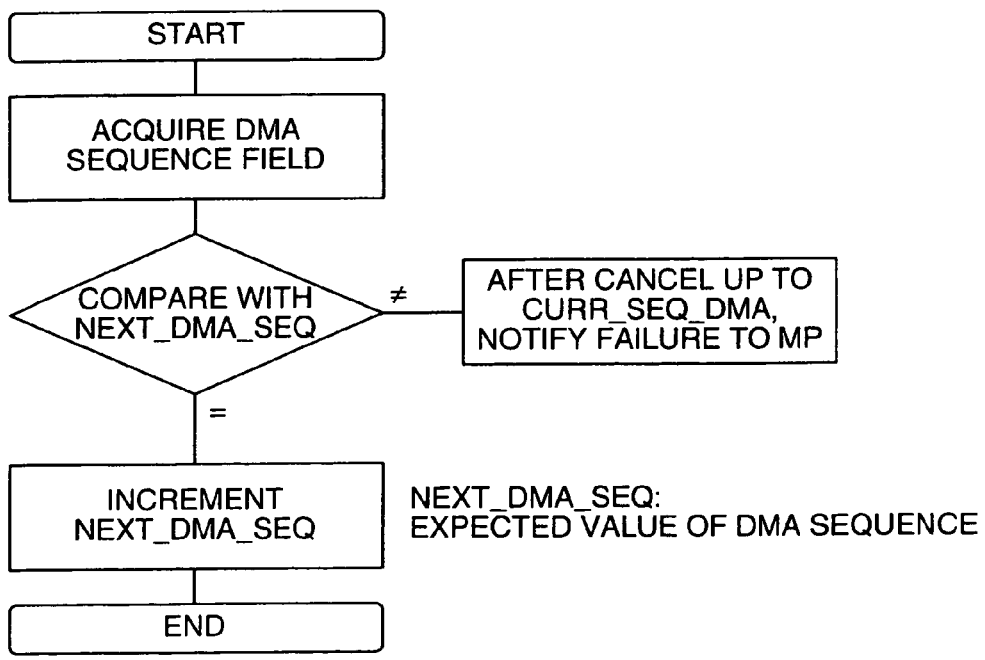
DMA SEQUENCE FIELD CONFIRMATION FLOW DURING
DMA SUB-STATUS RECEPTION

DISK CONTROLLER OF INVENTION

NETWORK CONFIGURATION OF CONVENTIONAL DISK CONTROLLER

PACKET STRUCTURE USED BY CONNECTION TYPE COMMUNICATION SYSTEM

CONVENTIONAL PACKET FLOW

CONVENTIONAL PROTOCOL

NON-MULTIPLEX COMMUNICATION TRANSFER PROTOCOL

STORAGE SYSTEM WITH DMA CONTROLLER WHICH CONTROLS MULTIPLEX COMMUNICATION PROTOCOL

CROSS-REFERENCES

This application is a continuation application of U.S. Ser. No. 10/826,471, filed Apr. 16, 2004 now U.S. Pat. No. 7,231,469 and is related to U.S. Ser. No. 11/249,174, filed Oct. 11, 2005, which is a continuation-in-part of U.S. Pat. Ser. No. 10/826,471.

BACKGROUND OF THE INVENTION

A) Field of the Invention

The present invention relates to a disk controller for controlling a plurality of disk drives, and more particularly to a high reliability disk controller using connection-less type multiplex communication.

B) Description of the Related Art

U.S. Pat. No. 6,601,134 and No. 2003046460 disclose a storage system.

A disk sub-system (hereinafter simply called a "sub-system") using magnetic disk drives as storage media has an input/output performance lower by three to four digits than that of a main storage of a computer using semiconductor storages as storage media. A lot of effort has been put into reducing this difference, i.e., improving the input/output performance of the sub-system. One method of improving the input/output performance of the sub-system is to use a disk controller which controls a plurality of magnetic disk drives into which data is distributively stored.

For example, a conventionally known disk controller such as shown in FIG. 16 has a plurality of channel adapters 2100 which execute data transfer between a host computer and a disk drive; a plurality of cache memory adapters 2300 for temporarily storing data to be transferred between the host computer and disk drive; a plurality of control memory adapters 2301 for storing control information on the operation of the disk controller; and a plurality of switch adapters 2400 for establishing connections between the cache memory adapters and channel adapters. The channel adapters 2100 and cache memory adapters 2300 are interconnected by a data system inner network via the switch adapters 2400. The channel adapters 2100 and control memory adapters 2301 are interconnected by a control system inner network. With these network connections, all the channel adapters 2100 can access the cache memory adapters 2300 and control memory adapters 2301.

Each channel adapter 2100 has: data link engines (DLEs) 2110 for executing packet transfer in the data system internal network; direct memory access (DMA) controllers (DMACs) 2120 for executing DMA transfer in the data system inner network; a selector 2115 for interconnecting DLEs 2110 and DMACs 2120; protocol engines (PE) 2130 for controlling communication between the host computer and disk drive; ports 2140 for connection to the host computer or disk drive; DLEs 2210 for executing packet transfer in the control system inner network; DMACs 2220 for DMA transfer in the control system inner network; micro-processors (MPs) 2230 for controlling the operation of the disk controller; and a selector 2125 for interconnecting DMACs 2120 and PEs 2130 or MPs 2230.

The cache memory adapter 2300 and control memory adapter 2301 each have: DLEs 2310 for executing DMA transfer in the data system internal network or control system internal network; DMACs 2320 for executing DMA transfer in each inner network; memory controllers (MCs) 2330; memory modules (MMs) 2340; a selector 2315 for interconnecting DLEs 2310 and DMACs 2320; and a selector 2325 for interconnecting DMACs 2320 and MCs 2330.

The switch adapter 2400 has: DLEs 2410 for executing packet transfer in the data system inner network; DMACs 2420 for executing DMA transfer in the data system inner network; and a selector 2430 for interconnecting DMACs 2420.

Data transfer between the adapters is realized by cooperative operations of DMACs in the respective adapters. As an example of this, with reference to FIGS. 18 and 19, description will be made on an outline operation of DMA transfer of data from the host computer to the cache memory adapter 2300 in the disk controller.

When a WRITE request is issued from the host computer via the connection port 2140, MP 2230 calculates an area of the cache memory adapter for temporarily storing WRITE data, and notifies the calculated result to DMAC 2120 in the channel adapter as a DMA list 2600. DMAC 2120 issues requests 2605 for acquiring paths to the cache memory adapters necessary for DMA transfer. Since the WRITE data is stored in a plurality of cache memory adapters (two cache memory adapters having DMAC 2321 and DMAC 2322) in order to improve the reliability, a plurality of path establishing requests are issued. After necessary paths are established, DMAC 2120 transfers the WRITE data to DMAC 2420 at the relay point switch, in accordance with the contents of the DMA list 2600. In this case, the WRITE data is transferred from the host computer by dividing it into a data amount having a predetermined size.

DMA 2420 of the switch adapter 2400 generates DMA sub-requests 2611 and 2612 for DMACs 2321 and 2322 of the cache memory adapters, in accordance with the transfer requests sent from DMAC 2120 of the channel adapter 2100. In response to the requests 2611 and 2612, DMACs 2321 and 2322 return sub-statuses 2621 and 2622 which are the request completion notices. After DMAC 2120 of the channel adapter confirms the sub-statuses 2621 and 2622, it issues the next DMA sub-request. When the sub-statuses of all the DMA sub-requests are returned, DMAC 2120 issues release requests 2625 for the established paths to the cache memory adapters, and returns a completion status 2630 to MP 2230 to thereby complete the process for the DMA list 2600. During the DMA transfer, MP 2230 accesses the control memory adapter 2301 when necessary. In this case, similar DMA transfer is performed between DMAC 2220 of the channel adapter 2100 and DMAC 2320 of the control memory adapter 2301.

FIG. 17 shows the structure of a packet used by DMA transfer. A command packet 2520 has: an address field 2521 for indicating a targeting DMAC; an address field 2522 for indicating an initiating DMAC; memory address fields 2523 and 2524 for indicating memory addresses at which transfer data is stored; and an error check code 2525.

The path establishing request 2605 is issued by using the command packet 2520. A data packet 2530 has: an address field 2531 for indicating a targeting DMAC; an address field 2532 for indicating an initiating DMAC; transfer data 2533; and an error check code 2535. The DMA sub-request is issued by using the data packet 2530.

FIG. 20 illustrates a transfer protocol for the path request command 2605 and DMA sub-request 2610. In order to facilitate a failure recovery process, processes are all executed by non-multiplex communication. Namely, after it is confirmed that the sub-status 2620 for the DMA sub-request 2610 is returned, the next DMA sub-request 2610 is issued.

SUMMARY OF THE INVENTION

As described above, DMA transfer in a conventional disk controller described in the above-cited Patent documents is performed by connection type non-multiplex communication because of easy implementation. Namely, DMAC establishes the paths necessary for the execution of DMA transfer, and during DMA transfer the paths are occupied (connection type communication). Moreover, until the sub-status for the DMA sub-transfer immediately before is confirmed, the next DMA sub-request cannot be executed (non-multiplex communication).

A conventional disk controller has therefore a low use efficiency of the inner network paths, which may hinder the performance improvement. In order to satisfy the conditions that the necessary path bandwidth is reserved at the limited path use efficiency, a complicated inner network configuration is required such as implementation of both the data system inner network and control system inner network, resulting in a high cost.

An object of the present invention is to provide a disk controller using connection-less type multiplex communication, capable of addressing issues of the prior art, realizing a high transfer efficiency (performance) while retaining a high reliability equivalent to that of a conventional disk controller, and realizing a low cost.

In order to solve the above-described issues, the present invention adopts the following configuration.

A disk controller includes: a channel adapter having a connection interface to a host computer or a disk drive; a memory adapter for temporarily storing data to be transferred between the host computer and disk drive; a processor adapter for controlling operations of the channel adapter and memory adapter; and a switch adapter for configuring an inner network by interconnecting the channel adapter, memory adapter and processor adapter, wherein: the channel adapter, memory adapter, processor adapter and switch adapter each include a DMA controller for performing a communication protocol control of the inner network; and packet multiplex communication is performed among the DMA controllers provided in the adapters.

According to the invention, by adopting connection-less type multiplex communication, multiplex becomes possible not only during one DMA sub-transfer (as will be later described, transfer state of the sub-DMA and sub-status shown in FIG. 11) but also during a plurality of sub-DMA transfers (alternative transfer state of sub-DMA 615 and sub-DMA 616 shown in FIG. 11). The path use efficiency can be improved considerably and it is not necessary to separately provide a control system inner network and a data system inner network as in the case of a conventional disk controller. Accordingly, the cache memory adapter and control memory adapter are integrated to a memory adapter. Since the path use efficiency is improved, the path use limitation is relaxed so that the processor in the channel adapter can be used in the processor adapter which is independent from the channel adapter. A disk controller can be realized which has a high performance and a low cost and is excellent in scalability.

BRIEF DESCRIPTION OF THE DRAWINGS

FIG. 12 is a diagram illustrating a DMA sequence field update flow during DMA sub-transmission used by the disk controller according to the embodiment.

FIG. 13 is a diagram illustrating a DMA sequence field confirmation flow during sub-status reception used by the disk controller according to the embodiment.

DESCRIPTION OF THE EMBODIMENTS

Embodiments of a disk controller of this invention will be described in detail with reference to FIGS. 1 to 15.

Figure 1:
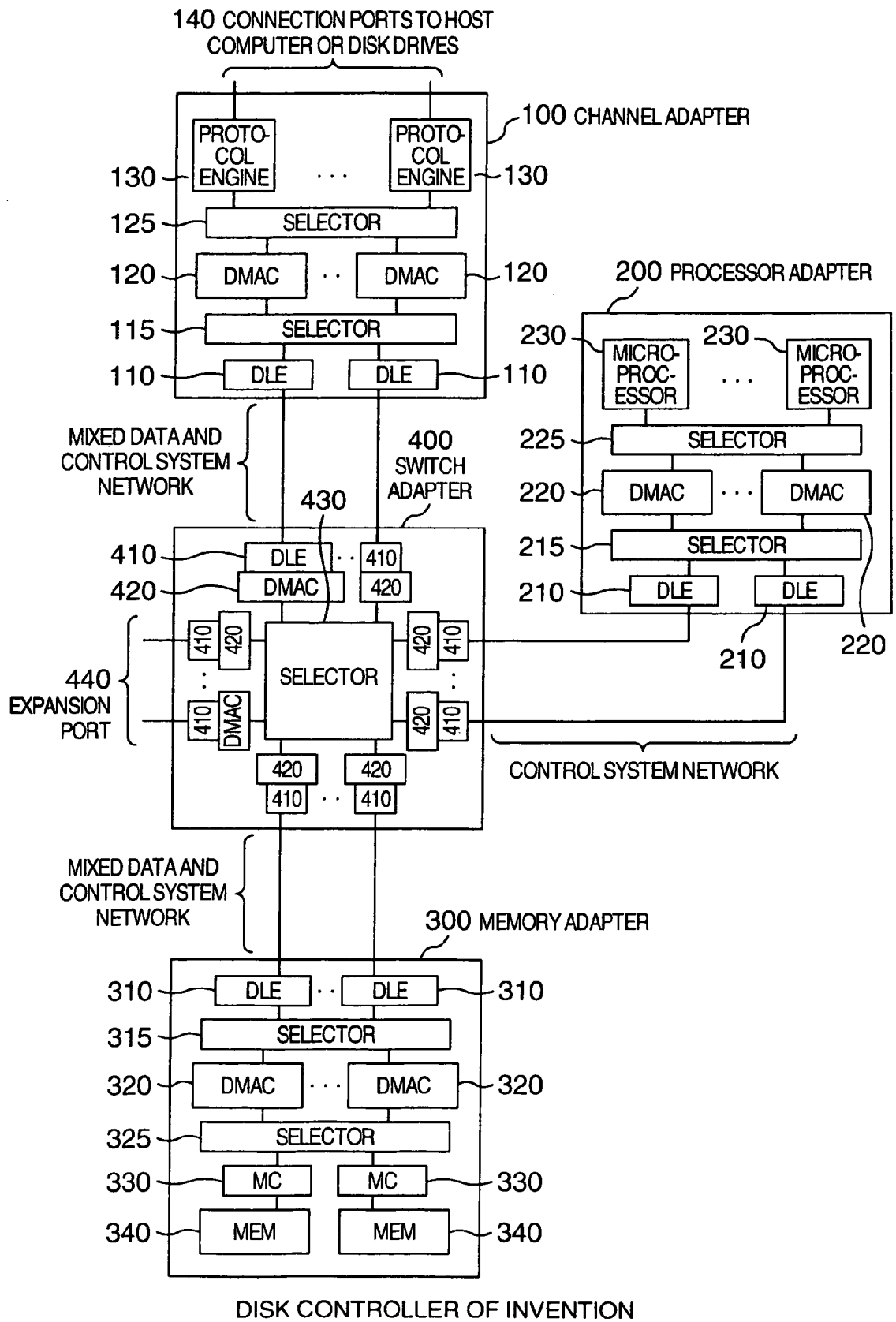
FIG. 1 is a diagram showing the overall structure of a disk controller according to an embodiment of the invention.

FIG. 1 is a diagram showing the overall structure of a disk controller according to an embodiment of the invention. The disk controller of this embodiment has: a channel adapter 100 having an interface 140 for connection to a host computer or a disk drive; a memory adapter 300 for temporarily storing data to be transferred between the host computer and disk drive; a processor adapter 200 for controlling the operations of the channel adapter 100 and a memory adapter 300; and a switch adapter 400 constituting an inner network by interconnecting the channel adapter 100, memory adapter 300 and processor adapter 200.

The channel adapter 100, processor adapter 200, memory adapter 300 and switch adapter 400 have DMA controllers (DMACs) 120, 220, 320 and 420, respectively, the DMA controllers performing a communication protocol control of the inner network. Switch adapters can be connected each other by their expansion ports 440. DMACs execute DMA transfer with involvement data link engines (DLEs) 110, 210, 310 and 410, respectively. Connection-less type packet multiplex communication shown in FIG. 11 is performed among these DMA controllers.

Figure 11:
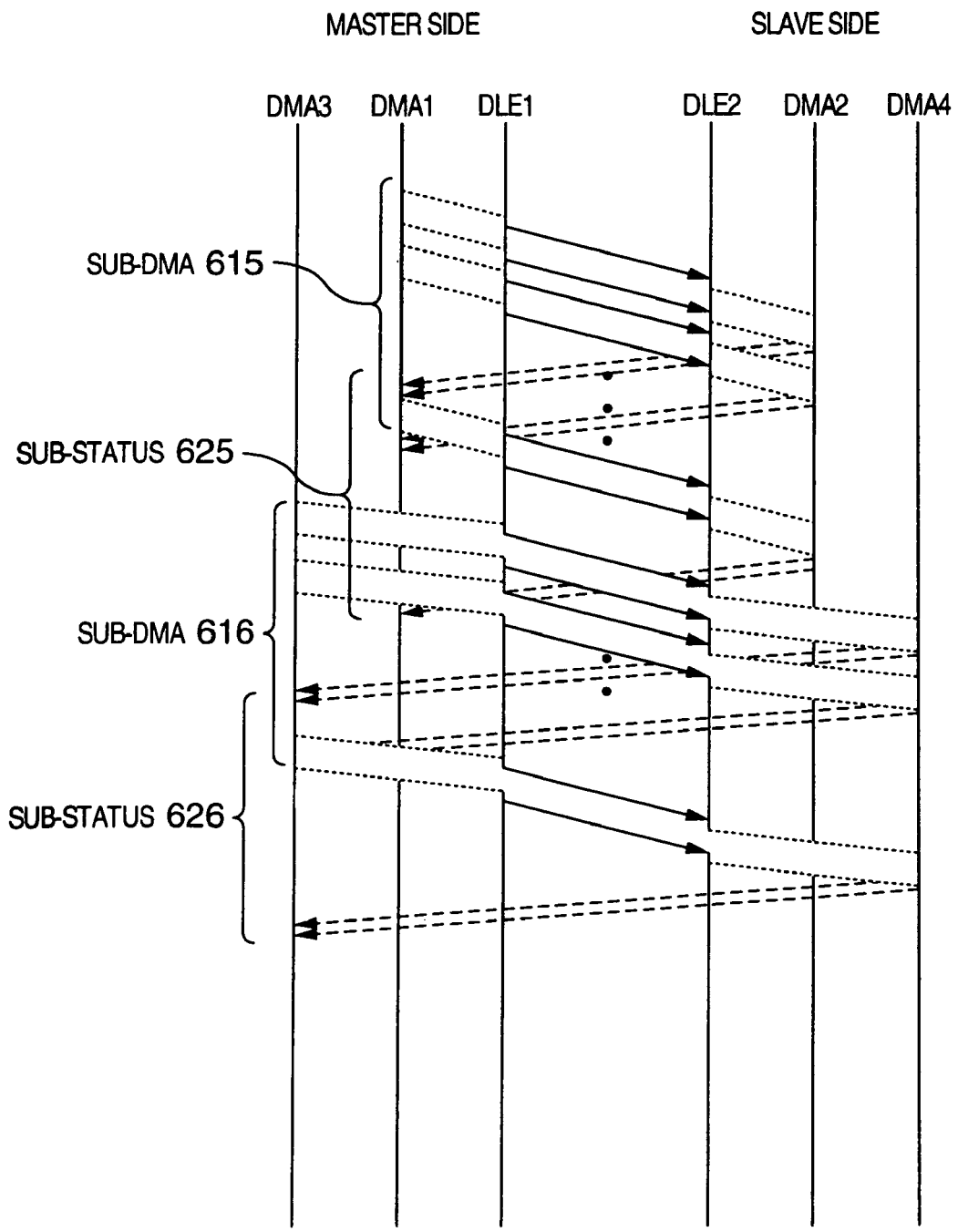
FIG. 11 is a diagram illustrating a multiplex communication transfer protocol used by the disk controller according to the embodiment.

FIG. 11 is a diagram illustrating a multiplex communication transfer protocol used by the disk controller according to the embodiment of the invention. As shown in FIG. 11, without confirming a sub-status for a DMA sub-request, the next DMA sub-request is issued (multiplex communication, i.e., multiplex communication during one DMA sub-transfer). In addition, DMA transfer between DMA1 and DMA2 and DMA transfer between DMA3 and DMA4 share the same path between DLE1 and DLE2 (connection-less type communication). In the example shown in FIG. 11, a sub-DMA 615 and a sub-DMA 616 are alternately transferred by sharing the same path between DELL and DLE2 to perform multiplex communication. As will be understood from the description of FIG. 8 to be later given, the connection-less type multiplex communication becomes possible by adopting the packet structure that contains information (TASK ID) for the sequence control of a destination, data and a DMA sub-request.

In the example shown in FIGS. 1 and 11, adopting the connection-less type multiplex communication allows multiplex not only during one DMA sub-transfer but also during a plurality of DMA sub-transfers. Therefore, the path use efficiency can be improved greatly (because data transfer can be performed without a time interval between paths). It is quite unnecessary to separately implement the control system inner network and data system internal network as made conventionally. It is therefore possible to use the memory adapter integrating the cache memory adapter and control memory adapter, and moreover to use the processor adapter independent from the channel adapter because the path use limit is relaxed. A disk controller of a low cost and excellent in scalability and flexibility can therefore be achieved.

Figure 2:
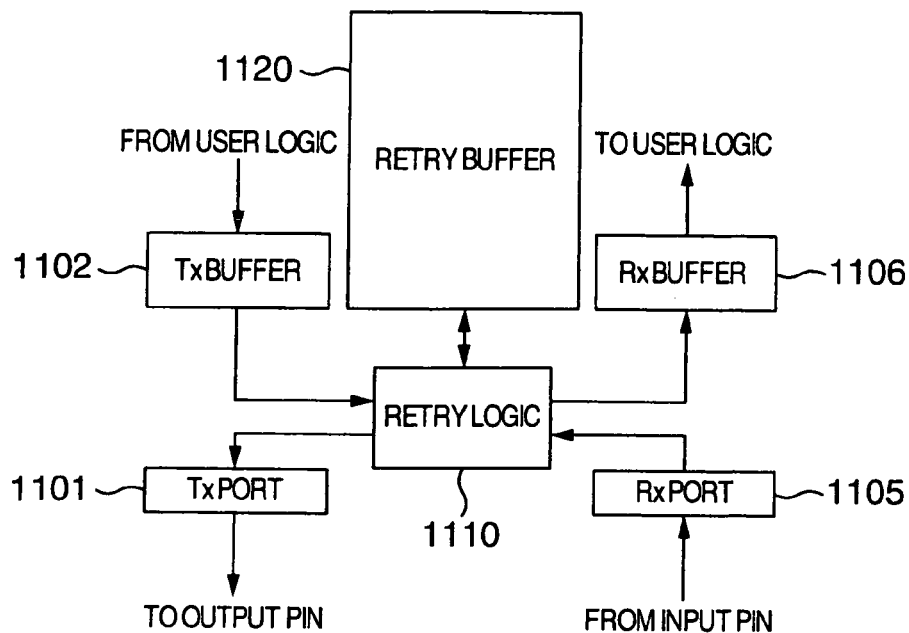
FIG. 2 is a diagram showing an example of the specific structure of a data link engine used by each adapter of the disk controller according to the embodiment.
Figure 5:
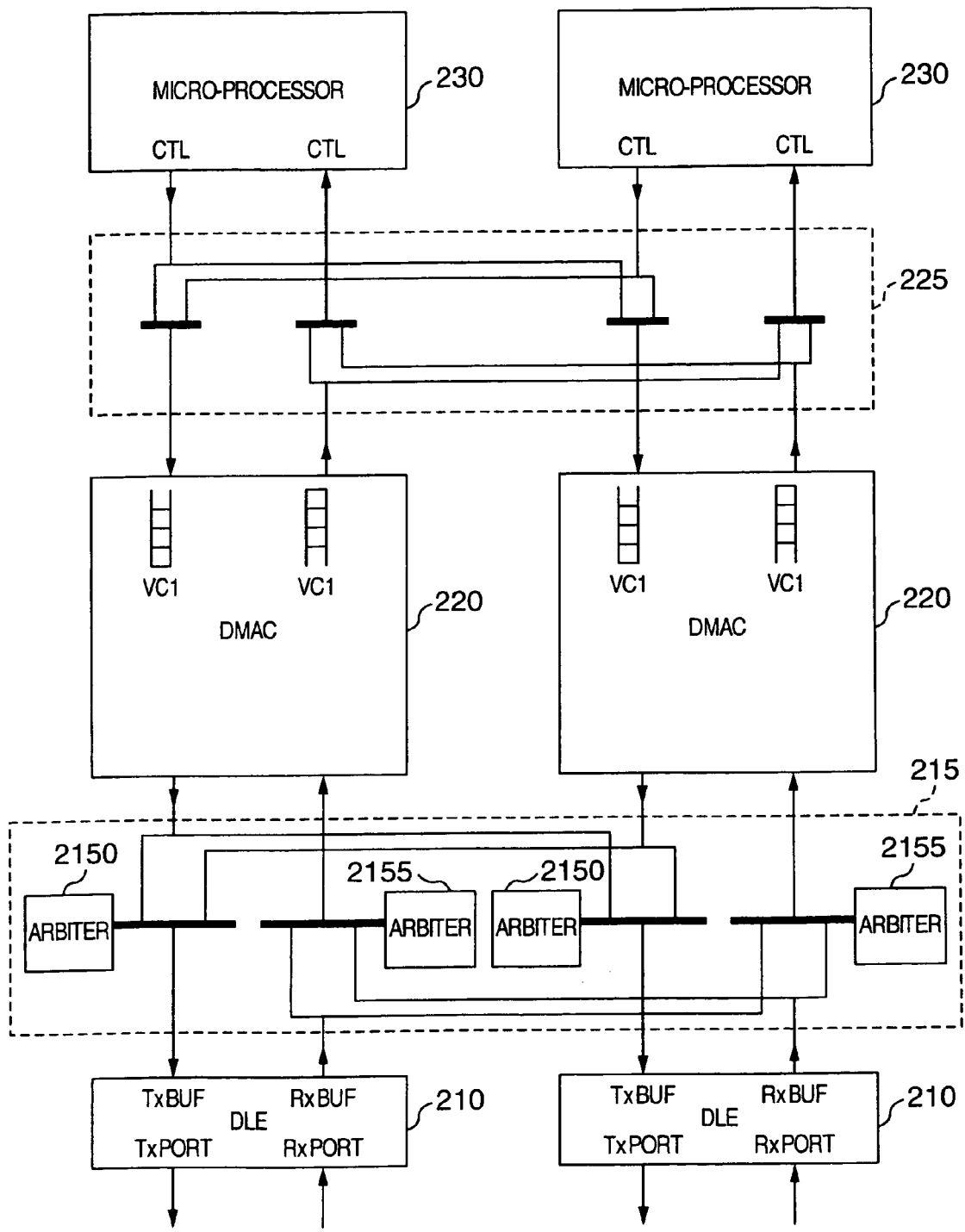
FIG. 5 is a diagram showing the structure of a processor adapter of the disk controller according to the embodiment.

FIG. 5 is a diagram showing an example of the specific structure of a processor adapter of the disk controller according to the embodiment of the invention, and FIG. 2 is a diagram showing the specific structure of a data link engine used by the processor adapter. The structure of the data link engine (DLE) shown in FIG. 2 can be applied not only to the processor adapter but also to other adapters.

The processor adapter 200 shown in FIG. 5 has: microprocessors (MPs) 230; a plurality of DMA controllers 220 and one or more data link engines (DLEs) 210. A selector 225 interconnects MPs 230 and DMACs 220, and a plurality of DMA controllers 220 share DLEs 210 via the selector 215. Namely, the number of DMACs is usually much larger than the number of DLEs.

Since a DMA arbiter 2150 of the selector 215 arbitrates requests from a plurality of DMA controllers 220, DMA transfer from a plurality of DMACs via the same DLE 210 can be executed at the same time (connection-less communication). Reception data from DLE 210 is distributed by a DLE arbiter 2155 to a target DMAC 220.

As shown in FIG. 2, DLE has a transmission port 1101, a transmission buffer 1102, a reception port 1105, a reception buffer 1106, a retry logic 1110 and a retry buffer 1120. The retry buffer and retry logic perform a process of realizing error free transfer at the data link. Namely, a packet sent from the transmission buffer to the transmission port is stored in the retry buffer 1120 by the retry logic 1110. A status representative of whether the packet reached correctly is returned to the reception port, and if an error is reported, the packet is again sent from the retry buffer by the retry logic. The DLE structure shown in FIG. 2 allows a data link error control in the packet unit and realizes multiplex communication.

With the example of the structure shown in FIGS. 5 and 2, connection-less type multiplex communication becomes possible and a disk controller can be realized which has a high performance and is flexible and simple and of a low cost.

Figure 3:
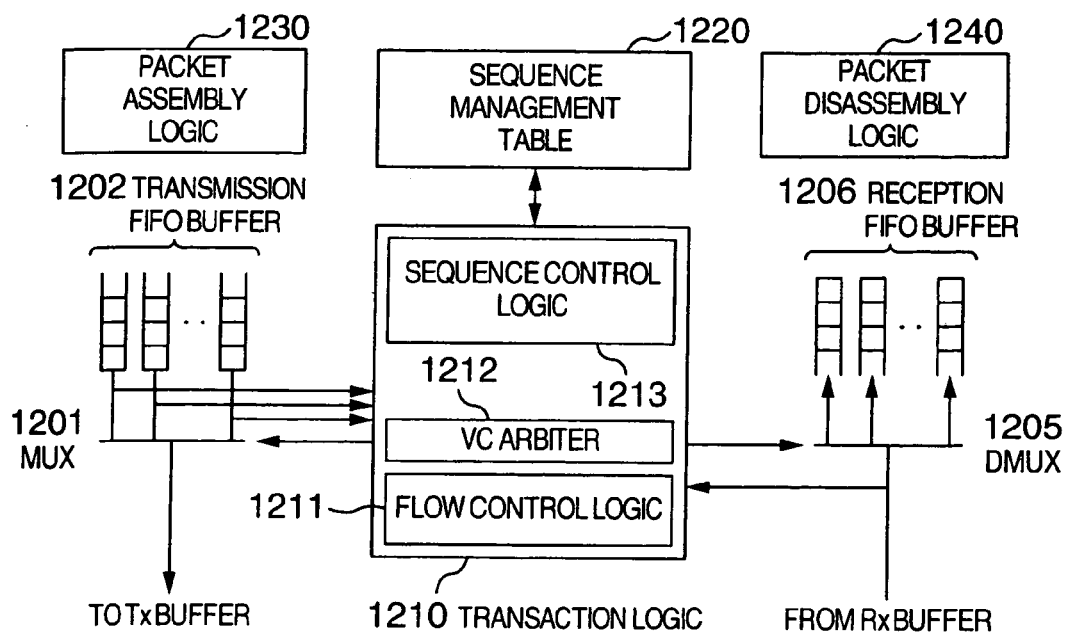
FIG. 3 is a diagram showing an example of the specific structure of a DMA controller used by each adapter of the disk controller according to the embodiment.
Figure 4:
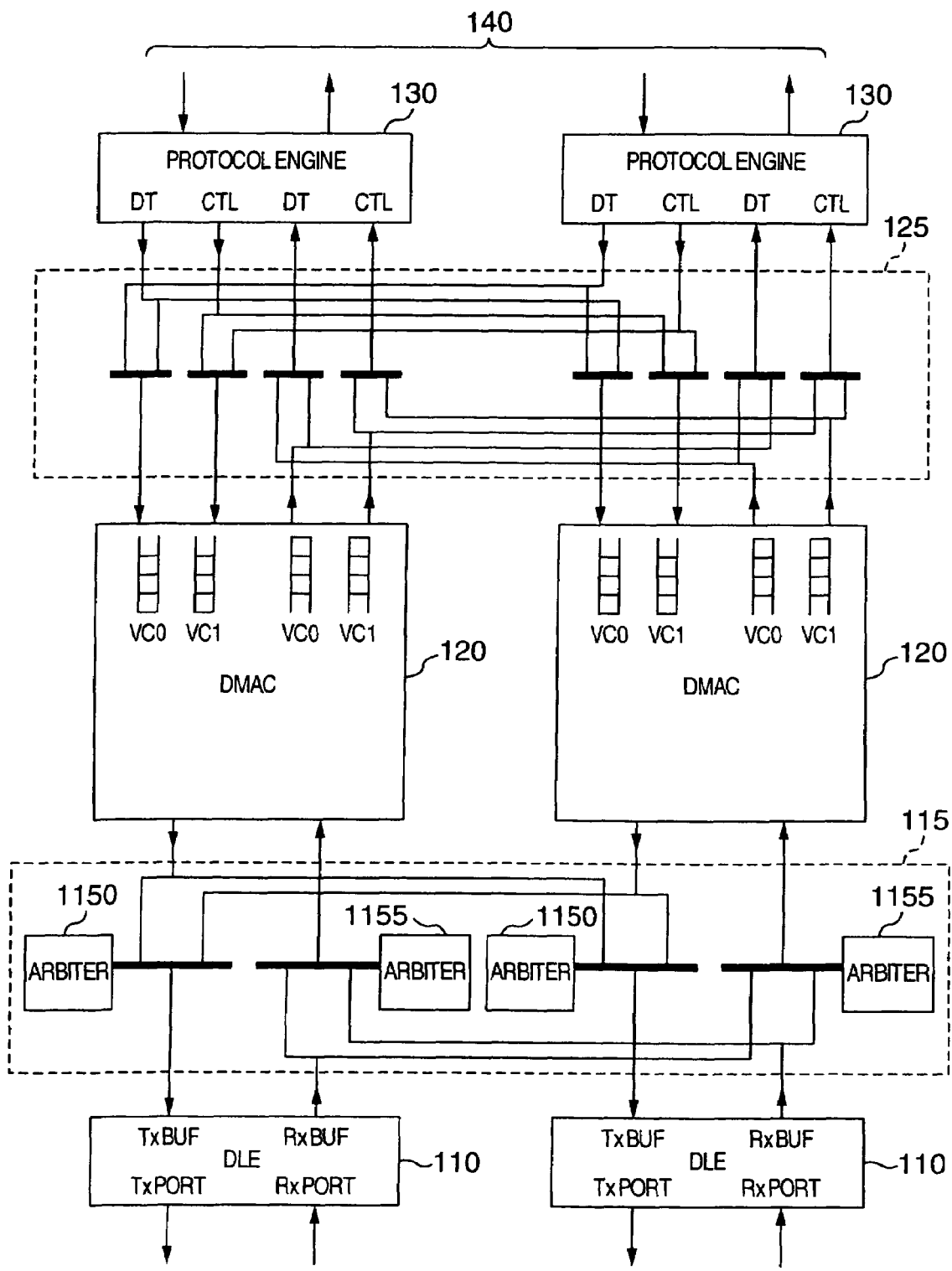
FIG. 4 is a diagram showing the structure of a channel adapter of the disk controller according to the embodiment.

FIG. 4 is a diagram showing an example of the specific structure of the channel adapter of the disk controller according to the embodiment of the invention, and FIG. 3 is a diagram showing an example of the specific structure of the DMA controller used by the channel adapter. The structure of the DMA controller (DMAC) shown in FIG. 3 is applicable not only to the channel adapter but also to other adapters.

The channel adapter shown in FIG. 4 has protocol engines 130, DMACs 120 and DLEs 110. PE 130 and DMAC 120 are connected by a selector 125, and DMAC 120 and DLE 110 are connected by a selector 115. Each DMA controller 120 has a plurality of reception FIFO buffers VC0 and VC1 and a plurality of transmission FIFO buffers VC0 and VC1.

The DMA controller 120 shown in FIG. 3 is constituted of a multiplexer 1201, transmission FIFO buffers 1202, a demultiplexer 1205, reception FIFO buffers 1206, a transaction logic 1210, a sequence management table 1220, a packet assembly logic 1230 and a packet disassembly logic 1240. An arbiter 1212 arbitrates contention of transmission data among a plurality of transmission FIFO buffers 1202 and the multiplexer 1201 selects the transmission data.

Similarly, the demulitplexer 1205 selects reception data under the control by the arbiter 1212 and stores it in a proper FIFO buffer among a plurality of reception FIFO buffers 1206. The packet assembly logic 1230 and packet disassembly logic 1240 are logic circuits for assembling and disassembling the packet. The sequence control logic 1213 and sequence management table 1220 manage the DMA sequence of DMA sub-transfers, the description of this operation being later given.

With the example shown in FIGS. 4 and 3, a plurality of buffers VC0 and VC1 can be used for each DLE. For example, one DLE can use a mixture of the control system inner network and data system inner network (for example, VC0 is used for the data system inner network, and VC1 is used for the control system network). The arbiter 1212 can operate to set a priority order to a plurality of buffers. For example, if the control system inner network is set to have a priority over the data system inner network, it is possible to avoid a longer access delay time of the control system inner network otherwise caused by a mixture of both the networks. Namely, with this arrangement, it is possible to realize a disk controller of a simpler inner network configuration and both the performance improvement and low cost.

Figure 6:
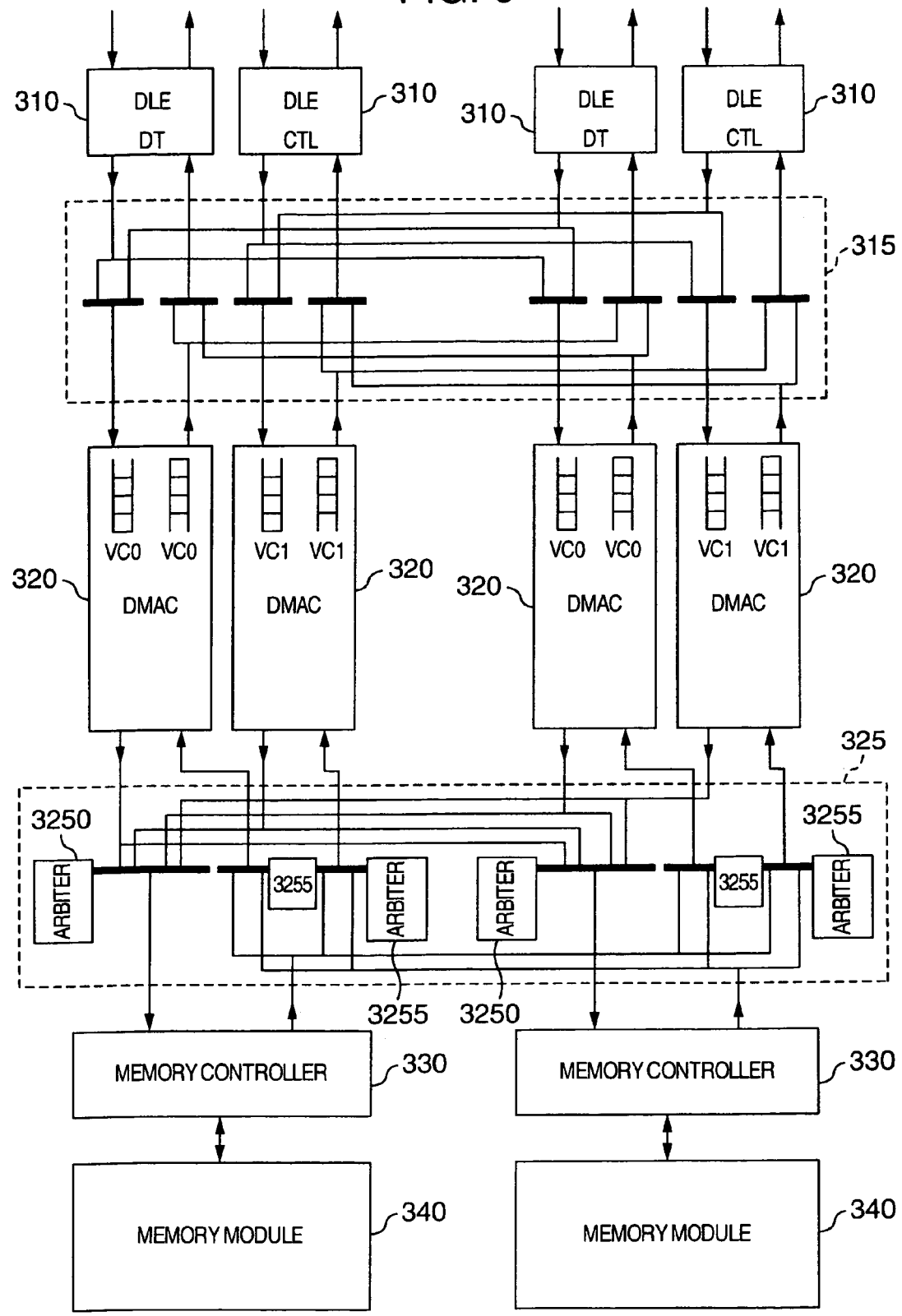
FIG. 6 is a diagram showing the structure of a memory adapter of the disk controller according to the embodiment.

FIG. 6 is a diagram showing an example of the specific structure of the memory adapter of the disk controller according to the embodiment of the invention. The memory adapter shown in FIG. 6 has memory modules (MMs) 340, memory controllers (MCs) 330, DMACs 320 and DLEs 310. MC 330 and DMAC 320 are interconnected by a selector 325, and DMAC 320 and DLE 310 are interconnected by a selector 315. Each DMA controller (DMAC) 320 has a reception buffer (VC0 or VC1) and a transmission buffer (VC0 or VC1). Contention of transmission data is arbitrated among a plurality of transmission FIFO buffers VC0 and among a plurality of transmission FIFO buffers VC1 to transfer data to DLE 310. Similarly, contention of reception data is arbitrated among a plurality of reception FIFO buffers VC0 and among a plurality of reception FIFO buffers VC1 to store data in a proper reception FIFO.

Arbiters 3250 and 3255 arbitrate the contention conditions between DMAC 320 and MC 330. One MC can therefore be shared by a plurality of DMACs, and the priority order control among DMACs can be realized as the function of the arbiters. For example, if DMACs for the control system inner network and DMACs for the data system inner network are provided and the DMACs for the control system inner network are set to have a priority over the data system inner network, then accesses to the control system inner network can be suppressed from being influenced by interference of the operation of the data system inner network.

With the structure shown in FIG. 6, a plurality of DMACs can be used in correspondence with one DLE. For example, one DLE has a mixture of the control system inner network and data system inner network. A plurality of DMACs can be used in correspondence with one MC allowing a mixture of the control system memory and data system memory. With this structure therefore, it becomes possible to realize a disk controller of a simpler inner network structure, satisfying both the performance improvement and low cost.

Figure 8:
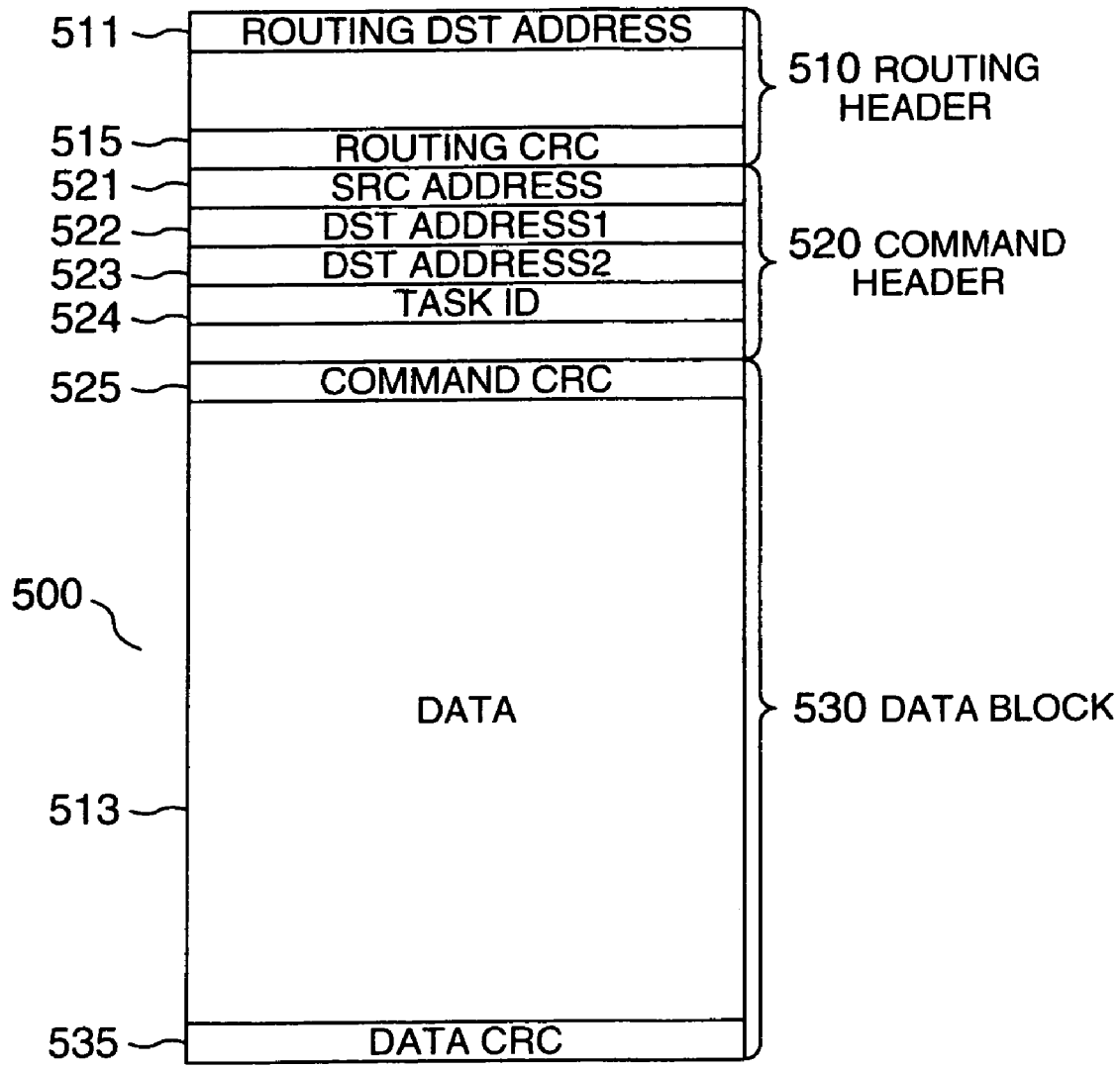
FIG. 8 is a diagram showing the structure of a packet used by the disk controller according to the embodiment.

FIG. 8 is a diagram showing an example of the specific structure of the packet to be transferred among a plurality of DMA controllers in the disk controller according to the embodiment of the invention. The packet 500 shown in FIG. 8 has at least an address field 511 for indicating a targeting DMA controller, an address field 521 for indicating an initiating DMA controller and a DMA sequence field 524 for managing the transfer sequence when one DMA transfer is divided into a plurality of packets.

In the disk controller according to the embodiment of the invention, since DMA transfer is performed by connection-less type multiplex communication, it is necessary to guarantee the transfer sequence of DMA and properly perform an error check process and a failure recovery process. As a means for this, the DMA sequential field is provided so as to reliably identify the packet, and this field is controlled (preferably sequentially incremented) so as to make it unique (distinguishable) in one DMA transfer.

With the example of the packet structure shown in FIG. 8, a proper sequence guarantee and its check are possible in the DMA transfer by connection-less type multiplex communication, and a proper failure recovery process can be performed when a failure occurs. With this structure, it becomes possible to realize a disk controller having a high reliability equivalent to the reliability of a conventional disk controller.

The packet 500 shown in FIG. 8 has a first address 511 for designating a packet relay DMA controller, second and third addresses 522 and 523 for designating targeting DMA controllers and transfer data 531 to be transferred to the targeting DMA controllers. When a WRITE request is issued from the channel adapter 100 to the memory adapter 300, the first address designates DMAC 420 of the switch adapter and the second and third addresses designate DMACs 320 of the memory adapter. A plurality of addresses of the memory adapters are designated in order to improve the reliability perform duplicate WRITE for the cache memories.

With this packet structure, the DMA transfer function including duplicate WRITE can be applied to connection-less multiplex communication so that the disk controller of a high reliability can be realized.

The packet 500 shown in FIG. 8 also has a routing header 510 containing control information for DLE, a command header 520 containing control information for the DMA controller, and a data block 530 containing other data. The routing header 510 has a routing header error check code 515 for checking any transfer error in the routing header. The command header 520 has a command header error check code 525 for checking any transfer error in the command header. The data block 530 has a data block error check code 535 for checking any transfer error in the data block.

With this packet structure, the routing control information, DMAC control information and data information can be protected by different error check codes, resulting in a finer DMA transfer control and a finer failure recovery process. Even if the routing control information is required to be rewritten such as when duplicate WRITE is performed via the switching adapter, it is possible to minimize the recalculation range of the error check code and realize the disk controller of a high reliability and a high performance.

Figure 9:
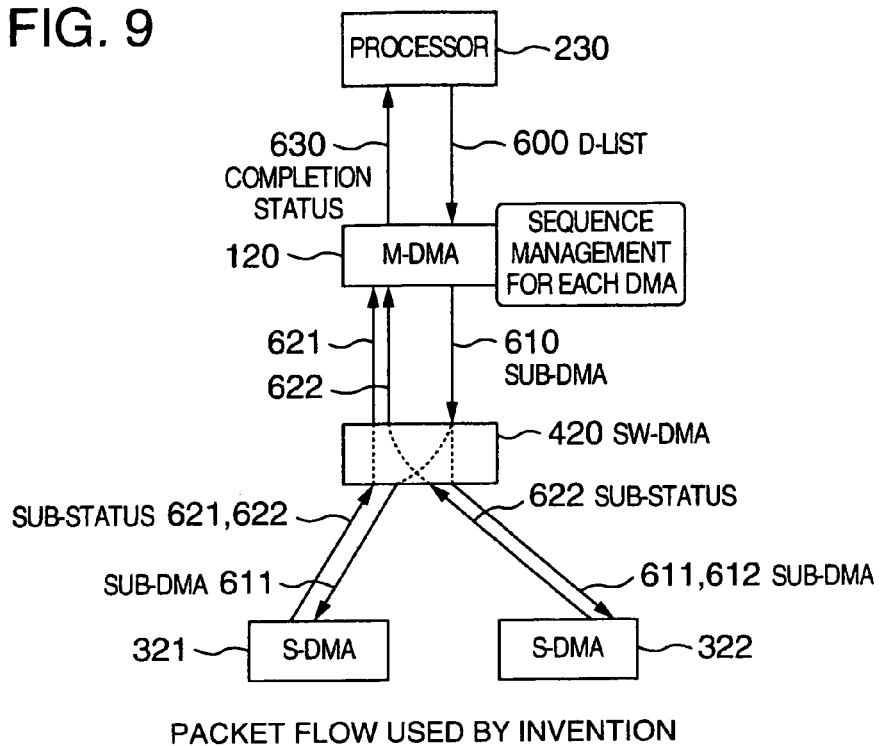
FIG. 9 is a diagram illustrating a packet flow used by the disk controller according to the embodiment.
Figure 10:
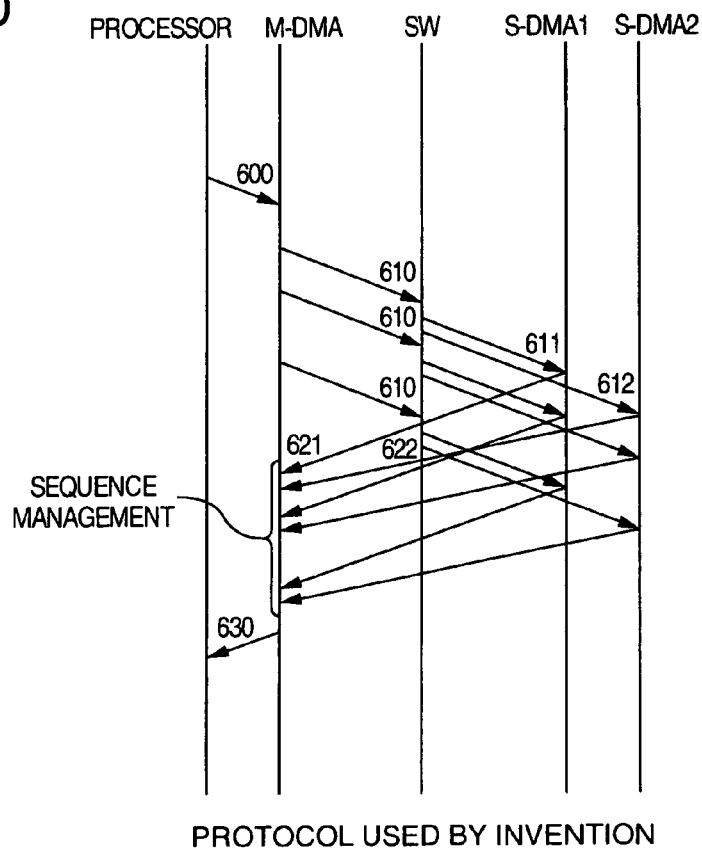
FIG. 10 is a diagram illustrating a protocol used by the disk controller according to the embodiment.

FIG. 9 is a diagram showing the flow of a packet used by the disk controller according to the embodiment of the invention, and FIG. 10 is a diagram illustrating a protocol used by the disk controller according to the embodiment of the invention. In the example shown in FIGS. 9 and 10, a DMA sub-request 610 is issued from DMAC 120 of the channel adapter to DMAC 420 of the switch adapter. In the packet of the DMA sub-request 610, the initiating address field 521 designates the channel adapter DMAC 120 as the master DMA and the targeting address field 511 designates the switch adapter DMAC 420.

The DMA controller 420 sends back completion sub-statuses 621 and 622 corresponding to the DMA transfer sub-request 610 to the DMA controller 120. The completion sub-statuses 621 and 622 contain the information of the DMA sequence field 524 contained in the DMA transfer sub-request 610. The DMA controller 120 confirms the information in this DMA sequence field in order to confirm the transfer sequence of DMA sub-transfers.

FIG. 12 is a diagram illustrating a DMA sequence field update flow during DMA sub-transmission used by the disk controller according to the embodiment of the invention, and FIG. 13 is a diagram illustrating a DMA sequence field confirmation flow during sub-status reception used by the disk controller according to the embodiment of the invention. Each DMAC holds the value of a current DMA sequence field in a variable CURR_DMA_SEQ. During the DMA sub-transmission, while CURR_DMA_SEQ is incremented, it is inserted into the DMA sequence field 524 of each transfer packet. Each DMAC holds the value of the DMA sub-status to be returned next, in a variable NEXT_DMA_SEQ. When the DMA sub-status is returned, the value of the DMA sequence is compared with an expected value. If both are coincide with each other, the coincident NEXT_DMA_SEQ is incremented. If both are not coincide, the DMA transfer sub-requests under execution (from NEXT_DMA_SEQ to CURR_DMA_SEQ) are cancelled and thereafter a failure is notified to the processor.

In the example of the structure shown in FIGS. 9 and 10 and FIGS. 12 and 13, also for the DMA sub-transfer, the transfer sequence of each DMA can be reliably controlled by using the DMA sequence field 524. Namely, with this structure, a disk controller of a high reliability can be realized using connection-less multiplex communication.

FIGS. 9 and 10 also illustrate a packet flow (protocol) of duplicate WRITE used by the disk controller according to the embodiment of the invention. In this example of the structure, DMA sub-requests 611 and 612 are issued from the channel adapter DMAC 120 to the memory adapter DMACs 321 and 322 via the switch adapter DMAC 420. In the packet of the DMA sub-request 610, the initiating address field 521 designates the channel adapter DMAC 120, the targeting address field 511 designates the switch adapter DMAC 420, the targeting field 511 designates the memory adapter DMACs 321 and 322, and the data block (field) 531 stores the transfer data.

The DMA controller 420 of the switch adapter generates a DMA sub-request packet 611 and a DMA sub-request packet 612 and transfers the packets to the respective targeting addresses. The former packet 611 has DMAC 321 as the targeting address field and contains the transfer data 531, and the latter packet 612 has DMAC 322 as the targeting address field and contains the transfer data 531. In response to the DMA sub-requests 611 and 612, the DMACs 321 and 322 of the memory adapter return sub-statuses 621 and 622 to the channel adapter DMAC 120 via the switch adapter DMAC 420.

The example of the structure shown in FIGS. 9 and 10 can realize cache memory duplicate WRITE by the switch adapter DMAC. Since DMAC 420 of the switch adapter 400 near the memory adapter 300 generates the packets for duplicate WRITE, the bandwidth of the inner network will not be consumed wastefully and the path efficiency can be improved. With the example of this structure, a disk controller of a high performance and a high reliability can be realized.

Figure 7:
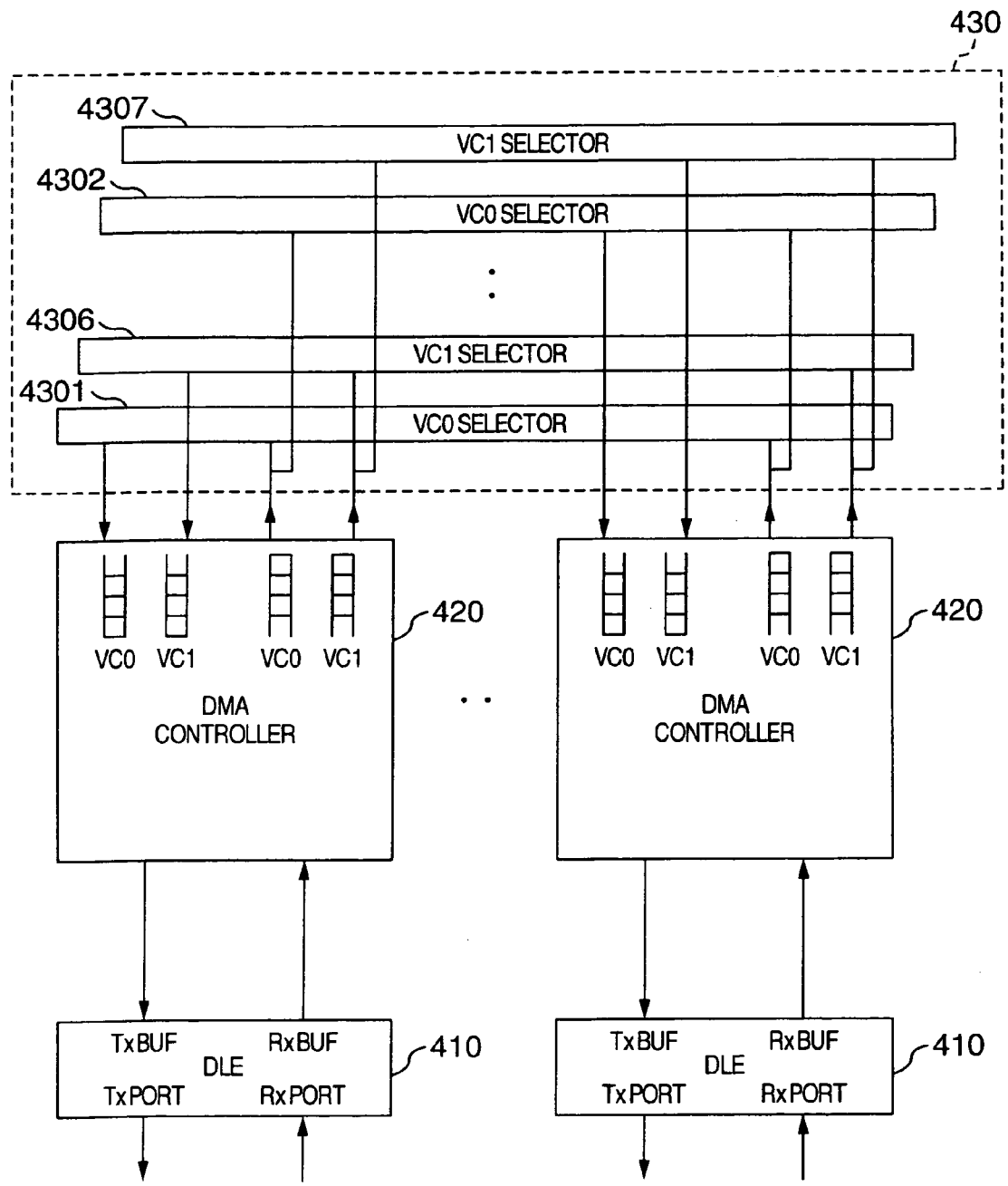
FIG. 7 is a diagram showing the structure of a switch adapter of the disk controller according to the embodiment.

FIG. 7 is a diagram showing an example of the specific structure of the switch adapter of the disk controller according to the embodiment of the invention. The switch adapter shown in FIG. 7 has a plurality of DLEs 410, a plurality of DMACs 420 and a selector 430. A packet received from a reception side DLE 410 is stored distributively in a plurality of reception FIFO buffers (VC0, VC1) in a reception side DMAC 420, and thereafter, sent to transmission FIFO buffers in a transmission DMAC 420 via selector logic circuits 4301, 4302, 4306 and 4307 prepared for the respective transmission FIFO buffers, and transmitted from a transmission side DLE 410.

With the example of the structure shown in FIG. 7, similar to the packet having the routing control information, DMAC control information and data information shown in FIG. 8, a packet to be transferred among a plurality of DMA controllers has a header including targeting DMAC information and a data field including other data. The header includes a header error check code for checking any transfer error in the header. The data field includes a data field error check code for checking any transfer error in the data field.

Until the header error check code is confirmed, the reception side DMA controller 420 in the switch adapter will not send the packet to the transmission side DMAC. After the header error check code is confirmed, the header and data field of the packet are sent to the transmission side DMAC in a pipeline processing manner. If an error is found by the header error check code, the packet is discarded and a proper error recovery process is executed.

With the example of the structure shown in FIG. 7, the switch adapter can start a transmission process from the transmission DLE before the whole data field is fetched from the reception DLE and the data field error check code is confirmed, and the packet having an illegal targeting address field because of an error in the header is discarded to prevent the propagation of the error. With the example of the structure, a disk controller of a high performance and a high reliability can be realized.

The adapter used by the disk controller according to the embodiment of the invention, such as the channel adapter shown in FIG. 4 and the processor adapter shown in FIG. 5, has the structure that a plurality of DMACs share a plurality of DLEs. In the case of the channel adapter shown in FIG. 4, two DLEs and sixteen DMACs are provided and there may be the case wherein each DMAC shares a few DLEs. With this redundancy structure, for example, during DMA communication by DMAC via some DLE, even if a failure occurs at this DLE, the DMAC arbiter 1150 (refer to FIG. 4) or 2150 (refer to FIG. 5) performs a routing control to connect another DLE. Similarly, the DMAC arbiter 1150 or 2150 performs a routing control for a plurality of DMAC processes to distribute the processes to a plurality of DLEs and realize load distribution.

With the example of the structure, the arbiter 1150 or 2150 controls to make the same DLE deal with transmission/reception for a series of DMA sub-requests and sub-statuses from the same DMAC. More preferably, a transmission/reception in the normal operation is fixed for the requests and statuses from the same DMAC.

With the example of the structure shown in FIGS. 4 and 5, the inner network route is fixed for a series of DMA sub-requests and sub-statuses. Therefore, there is no possibility of a sequence exchange (outrun) due to different routes. The sequence control of DMA sub-requests and sub-statuses can be facilitated greatly. Namely, with the example of the structure, a disk controller of a high reliability can be realized easily.

Figure 14:
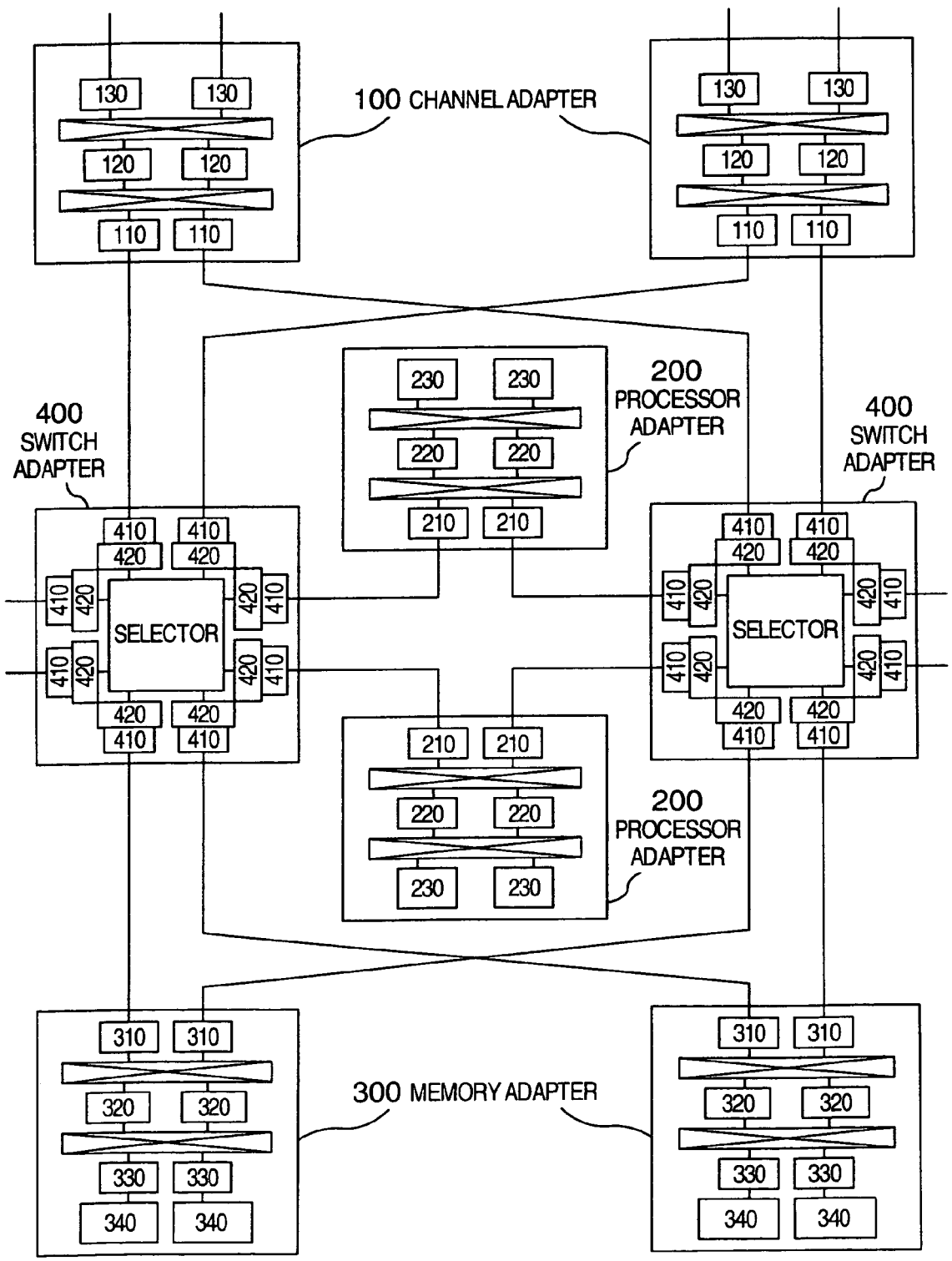
FIG. 14 is a diagram showing the overall structure of a disk controller according to another embodiment of the invention.

FIG. 14 is a diagram showing the overall structure of a disk controller according to another embodiment of the invention. In this embodiment of the invention shown in FIG. 14, a plurality of channel adapters 100, a plurality of processor adapters 200 and a plurality of memory adapters 300 are interconnected by a plurality of switch adapters 400. By providing a plurality of paths among all the adapters, it becomes possible to realize redundancy capable of recovering an arbitrary one-point failure. The connection of each adapter is as shown in FIG. 14. Each adapter has the paths for corresponding two adapters.

According to this embodiment of the invention, the reliability can be improved by enhancing the redundancy of the disc controller system.

Figure 15:
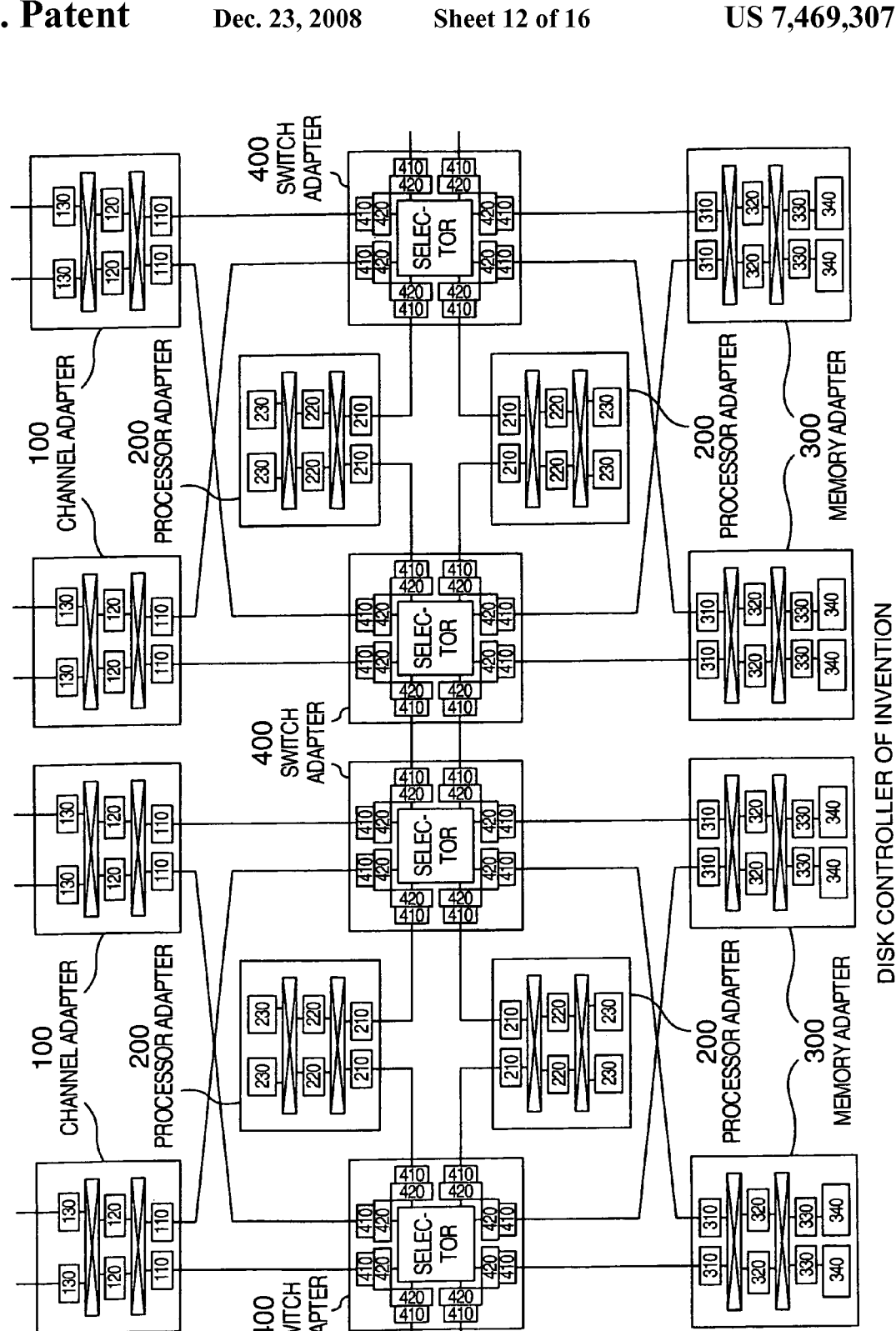
FIG. 15 is a diagram showing the overall structure of a disk controller according to still another embodiment of the invention.
Figure 16:
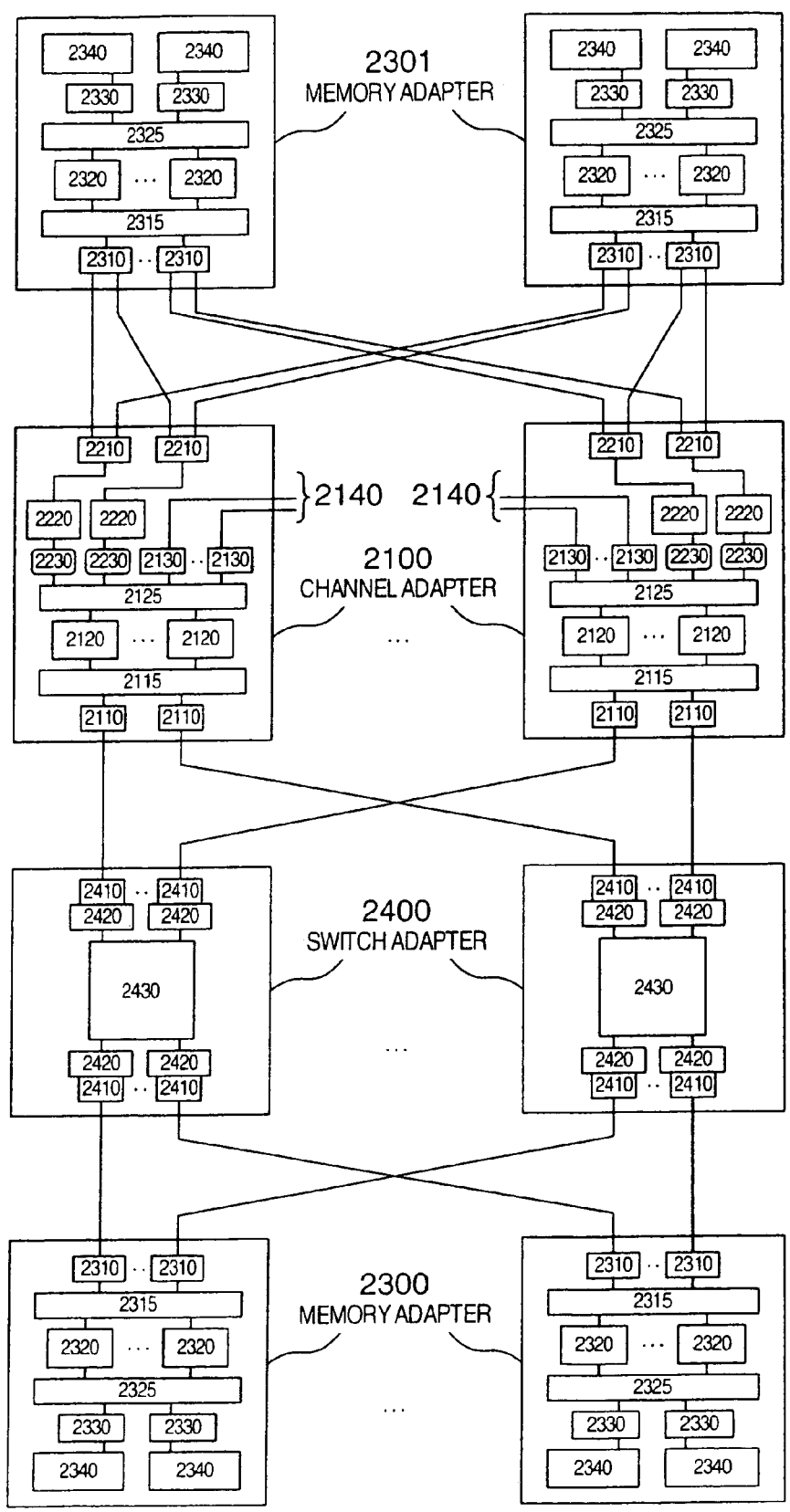
FIG. 16 is a diagram showing the overall structure of a conventional disk controller.
Figure 17:
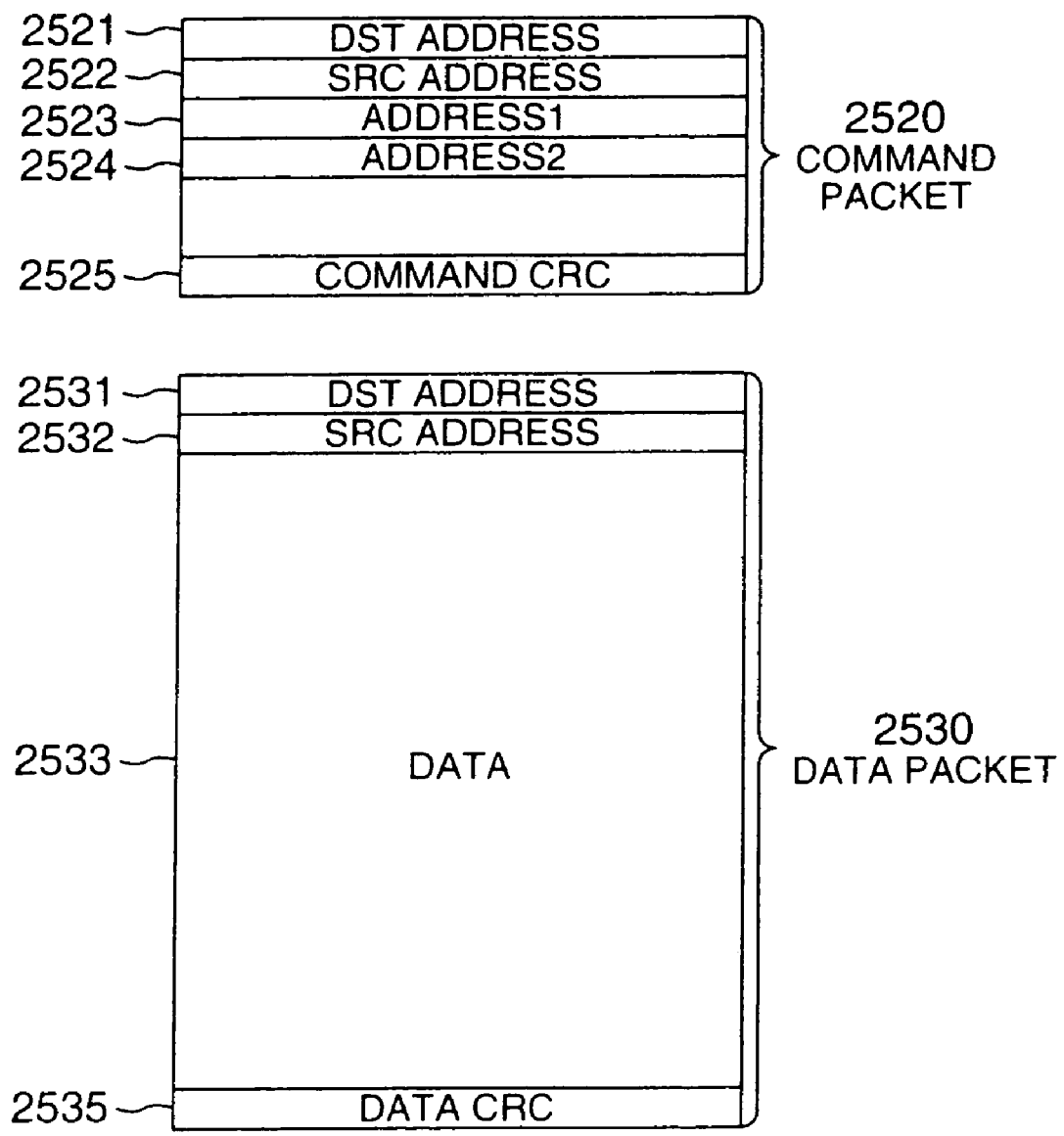
FIG. 17 is a diagram showing the structure of a packet used by the conventional disk controller.
Figure 18:
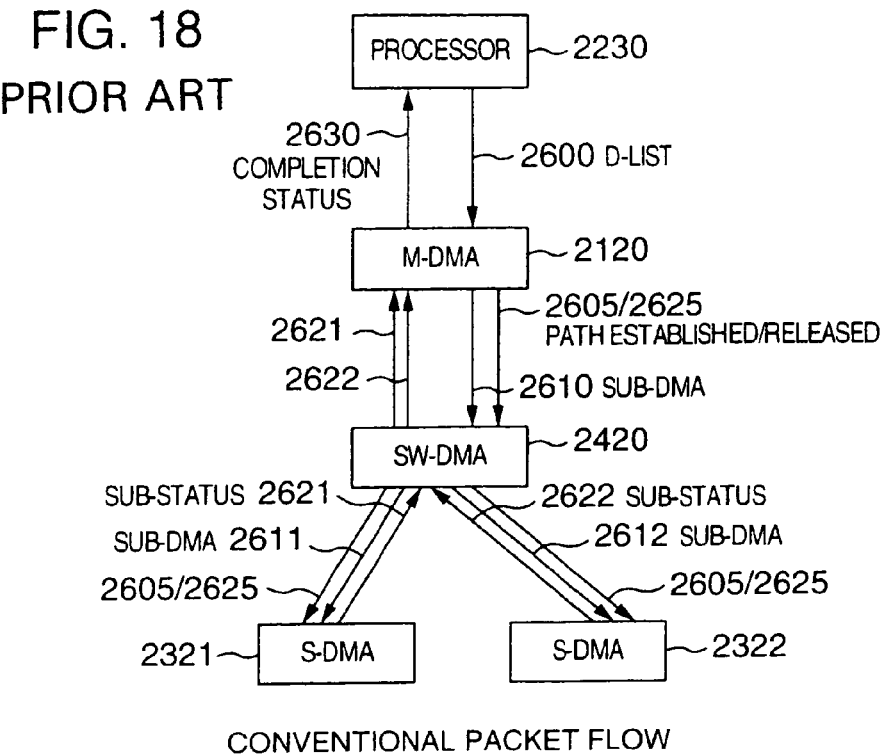
FIG. 18 is a diagram illustrating a packet flow used by the conventional disk controller.
Figure 19:
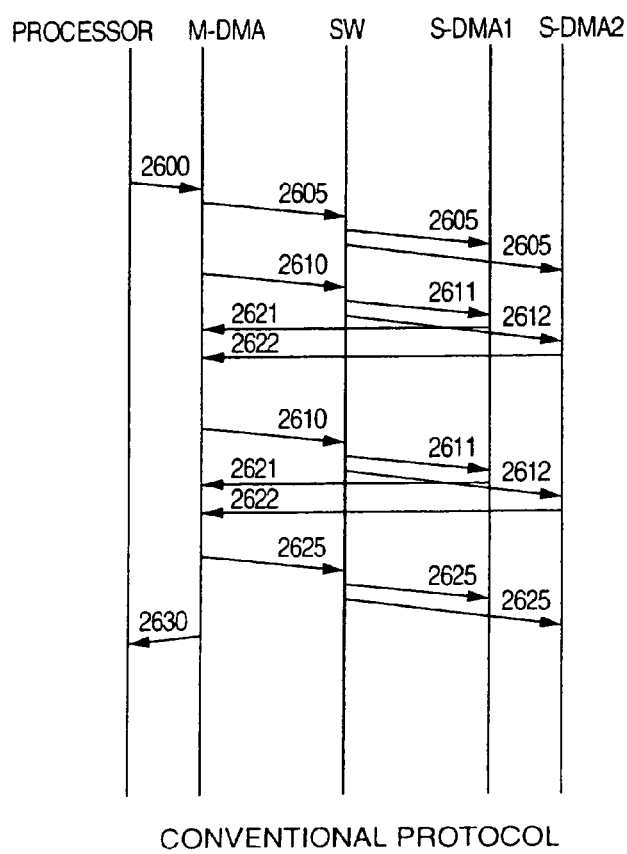
FIG. 19 is a diagram illustrating a protocol used by the conventional disk controller.
Figure 20:
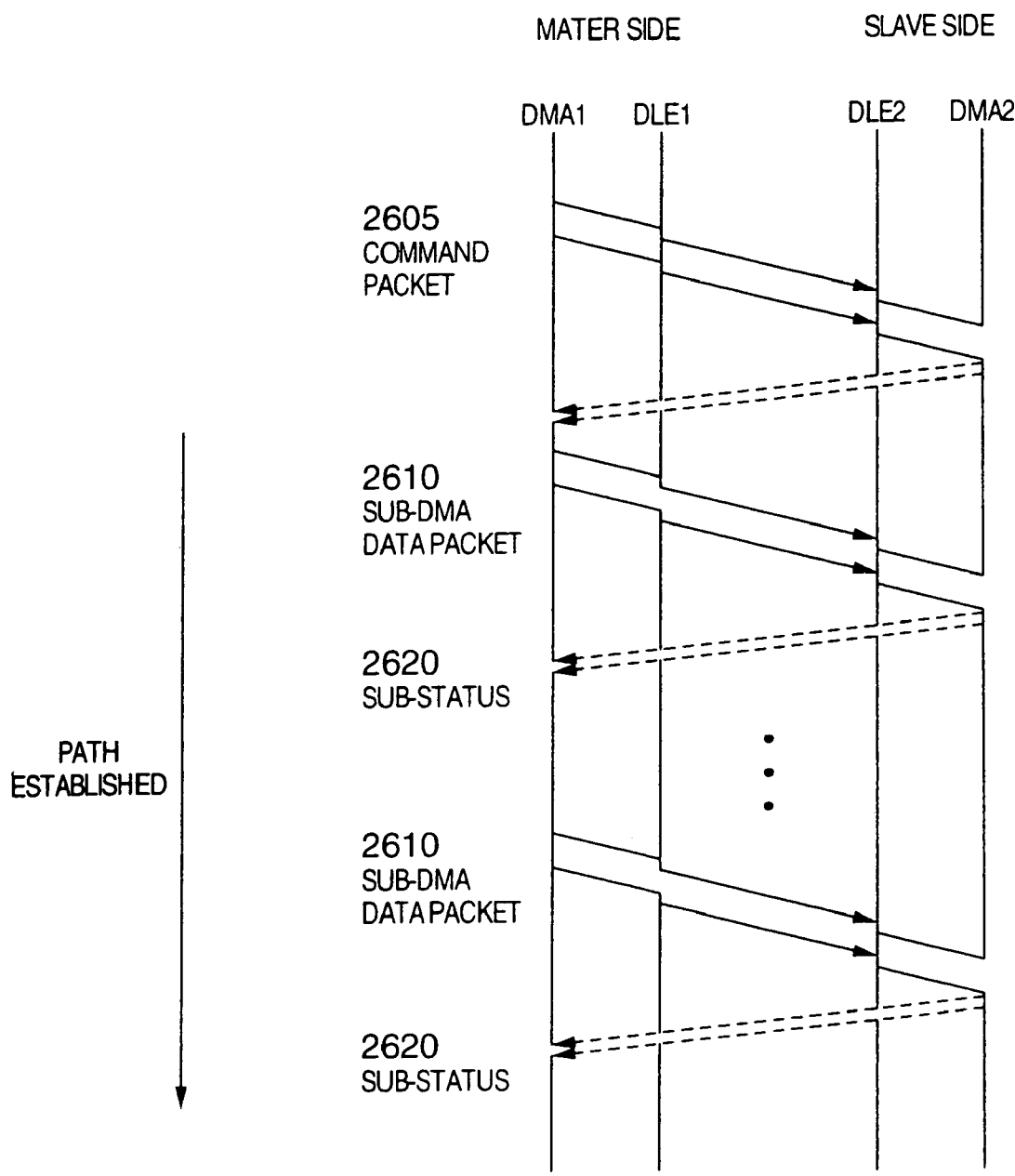
FIG. 20 is a diagram illustrating a non-multiplex communication protocol used by the conventional disk controller.

FIG. 15 is a diagram showing the overall structure of a disk controller according to still another embodiment of the invention. In this embodiment of the invention shown in FIG. 16, two disk controllers of the embodiment shown in FIG. 14 are used by coupling expansion ports of the switch adapters. With this connection, additional channel adapters, processor adapters and memory adapters can be installed so that the system scalability can be improved by using the same architecture. With this embodiment of the invention, the scalability of the disk controller can be improved.

As described so far, adopting the disk controller of the embodiments of the invention shown in FIGS. 1 to 15 can provide the following functions and effects. According to the embodiments, a plurality of buffers can be set in one-to-one corrrespondence with one DLE. For example, the control system inner network and data system inner network can be mixed in one DLE. The arbiter can set the priority order of a plurality of buffers. For example, if the control system inner network is set to have a priority over the data system inner network, it is possible to avoid a longer access delay time of the control system inner network otherwise caused by a mixture of both the networks. With this arrangement, it is possible to realize a disk controller of a simpler inner network configuration and both the performance improvement and low cost.

According to the embodiments, a plurality of DMACs can be set in one-to-one correspondence with one DLE. For example, the control system inner network and data system inner network can be mixed in one DLE. A plurality of DMACs can be set in one-to-one correspondence with one MC, so that the control system inner network and data system inner network can be mixed. A disk controller of a simpler inner network structure can be realized, satisfying both the performance improvement and low cost.

According to the embodiments, a proper sequence guarantee and its check are possible in the DMA transfer by connection-less type multiplex communication, and a proper failure recovery process can be performed when a failure occurs. With this structure, it becomes possible to realize a disk controller having a high reliability equivalent to the reliability of a conventional disk controller. According to the embodiments, the routing control information, DMAC control information and data information can be protected by different error check codes, resulting in a finer DMA transfer control and a finer failure recovery process. Even if the routing control information is required to be rewritten such as when duplicate WRITE is performed via the switching adapter, it is possible to minimize the recalculation range of the error check code and realize the disk controller of a high reliability and a high performance.

According to the embodiments, it becomes possible to realize cache memory duplicate WRITE by the switch adapter DMAC. Since DMAC of the switch adapter near the memory adapter generates the packets for duplicate WRITE, the bandwidth of the inner network will not be consumed wastefully and the path efficiency can be improved.

According to the embodiments, the switch adapter can start a transmission process from the transmission DLE before the whole data field is fetched from the reception DLE and the data field error check code is confirmed, and the packet having an illegal targeting address field because of an error in the header is discarded to prevent the propagation of the error. According to the embodiments, since the inner network route is fixed for a series of DMA sub-requests and sub-statuses, there is no possibility of a sequence exchange (outrun) due to different routes. The sequence control of DMA sub-requests and sub-statuses can be facilitated greatly.

According to the embodiments, the reliability can be improved by providing the redundance with the disk controller system. According to the embodiments, the scalability of the disk controller can be improved.

This application relates to and claims priority under 35 U.S.C. 119 from Japanese Patent Application No. 2004-038459 filed on Feb. 16, 2004 which is cited to support the present invention.

What is claimed is:

1. A storage system comprising:
   an interface unit having a connection interface to a host computer or a disk drive;
   a memory unit for temporarily storing data to be transferred between said host computer and said disk drive;
   a processor unit for controlling operations of said interface unit and said memory unit; and
   an inner network interconnecting said interface unit, said memory unit and said processor unit,
   wherein said interface unit, said memory unit, and said processor unit each includes a direct memory access (DMA) controller which controls multiplex communication transfer protocol of said inner network, and
   wherein the multiplex communication transfer protocol is performed among said DMA controllers provided in said units.

2. The storage system according to claim 1, wherein each of said DMA controllers controls a transfer sequence of packets in accordance with information in sequence fields included in the packets.

3. The storage system according to claim 1, wherein each of the packets includes an address field for a targeting address, and
   wherein, when said interface unit transfers a request in a packet having an address in an address field indicating said memory unit, a DMA controller of said interface unit transfers data to a memory unit indicated by said address.

4. The storage system according to claim 1, further comprising:
   a switch unit for configuring said inner network by interconnecting said interface unit, said memory unit and said processor unit.

* * * * *